UNITED STATES PATENT OFFICE 2,259,494

TREATMENT OF THE ACID RESULTING FROM NITRATING CELLULOSE

William E. Sillick, Rochester, N. Y., assignor to Eastman Kodak Company, Rochester, N. Y., a corporation of New Jersey No Drawing. Application October 31, 1939, Serial No. 302,205

5 Claims. (Cl. 260—220)

This invention relates to the treatment of spent nitrating acid resulting from the nitration of cellulose which involves cooling the acid prior to its storage and reuse for a subsequent nitration.

My invention relates to the manufacture of nitrocellulose by the usual methods in which cellulose is nitrated by a mixture essentially consisting of sulfuric acid and nitric acid. In this process undesired organic products form, probably from side reactions which occur in the nitration. Many of these undesired organic products are either in solution in the acid or are not removed from the acid when the acid is separated from the nitro-cellulose such as by centrifuging. The spent nitrating acid is reused usually by discarding a portion of it and fortifying the remainder by adding fresh concentrated acids thereto. Because of the successive use of a nitrating acid, the undesirable organic products build up in concentration until an equilibrium is reached when the amount formed by a single nitration equals the amount removed from the system in the portion of acid discarded.

The organic products present in the spent nitrating acid are undesirable in that they are easily oxidized at the temperature of that acid at the end of the nitration if the nitration temperature is above 90° F. This oxidation reaction forms water and nitrogen oxides such as $NO_2$ (or its dimer $N_2O_4$). Thus the concentration of nitric acid is decreased and that of water is increased, both of which increase the cost of strengthening the acid.

When the spent nitrating acid contains a large amount of dissolved organic material this oxidation reaction, which is exothermic, may generate more heat than can be radiated and conducted away from the container. This raises the temperature and further increases the rate of oxidation so that boiling might finally result. Such a condition gives rise to large material losses and presents a very grave hazard to person and property.

This danger has been previously recognized and the remedy which has been proposed is a controlled oxidation of the organic matter present in the spent nitrating acid and its subsequent removal as carbonaceous gases particularly $CO_2$. This controlled oxidation, altho it does eliminate any danger from vigorous oxidation of the organic material, does not prevent the formation of water and of nitrogen oxides in the acid.

One object of my invention is to provide a method of storing spent nitrating acids without any danger from uncontrolled oxidation therein. Another object of my invention is to provide a method for storing spent nitrating acids in which the water content is not appreciably increased and the nitric acid present is not appreciably reduced. Other objects will appear herein.

I have found that the temperature of the spent nitrating acid is fairly critical as regards its storage. I have found that if the spent nitrating acid is cooled to a temperature below approximately 90° F. immediately after its separation from nitrocellulose and kept below 90° F. that the oxidation of organic material therein is inhibited so that there is no appreciable loss of nitric acid or increase of water content therein.

I have found that if the spent nitrating acid is immediately cooled to a temperature below approximately 90° F. such as approximately 80° F. that the temperature of the mass actually decreases upon storage at room temperature whereas without cooling and in spite of the temperature of the acid initially being above room temperature, the temperature of the spent nitrating acid increases. I have found that in the manufacture of nitrocellulose in which my invention is utilized, the nitrogen oxide values of the spent nitrating acids average approximately 3.5% whereas without cooling, the nitrogen oxide values of the spent nitrating acids average approximately 5% and in hot weather approximately 5.5%.

My invention may be satisfactorily performed by pumping or piping the spent acid from the nitrators thru a cooling means on its way to the tank in which the acid is to be stored. When the acid exits from the cooler it should have a temperature of less than 90° F. The acid will not rise in temperature unless the atmospheric temperature is above the temperature of the acid. Therefore to avoid a rise in temperature in hot weather the storage tank should be cooled or if that is not possible, should be effectively insulated from outside heat such as by surrounding it with a dead air space.

The preferred temperature to which the spent acid should be cooled is approximately 80° F. It is desirable to not cool below 70° F. for economical reasons as it is necessary to warm the acid to nitrating temperature when it is to be used and with a low cooling temperature, much heat subsequently to bring up to nitrating temperature is required. With cold outdoor temperatures this may be difficult to avoid especially with an outside storage tank unless heat is applied, which would not contribute to the economy of the process.

In practice it is desirable to discard a portion of the spent acid and fortify the remainder prior to its storage. This may be done either before or after the cooling operation, the latter being preferred. The fortification of the spent acid seems to aid the keeping qualities of the nitrating acid in storage. By cooling before discarding a portion of the spent nitrating acid, that portion is at a temperature at which it is more stable when stored.

Another advantage of cooling before fortification is that the rise in temperature resulting from fortification does not start a progressive deterioration of the spent nitrating acid which might happen to the acid if fortified without being cooled. It is to be understood however that the whole of the spent nitrating acid may be stored without dividing after its cooling.

The nitration of cellulose and the fortifying of the spent acid are old in the art and therefore the prior art may be referred to for a showing of processes to which my invention is applicable. For example some nitrating processes in which my invention could be utilized are those described in U. S. Patents Nos. 2,118,275, 1,641,292, 2,105,627 and 1,913,416.

My invention involves the positive cooling of the spent nitrating acid prior to its storage rather than allowing the mass to cool by standing at ordinary temperature. With slow cooling such as by standing undesirable oxidation occurs. By my invention this oxidation is minimized. By depending on storage of the mass for cooling, such as was formerly done, the temperature of the stored acid may not decrease appreciably for 2 or 3 days or longer so that the formation of water and the using of nitric acid occur before the mass is effectively cooled.

The most convenient and practical method of carrying out my invention which I have found, is to pump the spent nitrating acid preferably before its fortification thru a coil or other heat exchange apparatus the outside of which contacts a cooling agent such as cool water, or some other liquid, having a low temperature for instance of approximately 40–60° F. The cooling has been found to proceed readily when the cool liquid is passed over the exterior surface of the heat exchange apparatus and is either recooled or replaced with other cool liquid of like kind.

The following examples illustrate the cooling of spent acids in accordance with my invention.

*Example I*

The spent acid from the nitration of cellulose, which acid contains nitric acid, sulfuric acid, nitrogen oxides, water and organic matter, and has a temperature of 126.5° F. was pumped at the rate of 100,000 lbs. per hr. thru a cooling apparatus consisting of pipes immersed in a moving body of cool water. The cooling water had a temperature initially of 46° F. and after use of 91° F. The spent acid had been cooled down to a temperature of 85.5° F. and was sent to the storage tank, where it was kept without any increase in temperature or any substantial increase in nitrogen oxide content after 48 hrs. and longer.

*Example II*

The spent acid from nitrating cellulose, having the composition specified in Example I and a temperature of 123° F. was pumped at the rate of 100,000 lbs. per hr. thru a cooler as described in the previous example. The cooling water had an initial temperature of 60.5° F. and after use of 94.5° F. The spent acid was cooled down to 88.5° F. A portion of the spent acid was discarded and the remainder was fortified and sent to the storage tank. Approximately 40,000 gal. of water was required to accomplish the cooling.

When ready for a subsequent nitrating, the stored fortified acid was analyzed to enable adjusting of the nitrating acid to the exact composition desired. After the nitrating acid was of the desired composition, a batch of cellulose was nitrated therewith in accordance with usual nitrating practice such as disclosed by the patents listed herein.

I claim:

1. In the process of preparing nitrocellulose in which the spent nitrating acid which is separated from the nitrocellulose has a temperature above 90° F. and is stored either in whole or part for reuse in a subsequent nitration, the step which comprises subjecting the spent nitrating acid to a positive cooling to a temperature of less than 90° F. immediately after its separation from the nitrocellulose but prior to placing it in the storage receptacle.

2. In the process of preparing nitrocellulose in which the spent nitrating acid which is separated from the nitrocellulose has a temperature above 90° F. and is stored either in whole or part for reuse in a subsequent nitration, the step which comprises subjecting the spent nitrating acid to a positive cooling to a temperature of approximately 80° F. immediately after its separation from the nitrocellulose but prior to placing it in the storage receptacle.

3. In the process of preparing nitrocellulose in which the spent nitrating acid which is separated from the nitrocellulose has a temperature above 90° F. and is stored either in whole or part for reuse in a subsequent nitration, the step which comprises passing the spent nitrating acid through a cooling means which decreases the temperature of the acid to less than 90° F. while on its way to the storage receptacle.

4. In the process of preparing nitrocellulose in which the spent nitrating acid which is separated from the nitrocellulose has a temperature above 90° F. and is stored either in whole or part for reuse in a subsequent nitration, the step which comprises passing the spent nitrating acid through a cooling means which decreases the temperature of the acid to approximately 80° F. while on its way to the storage receptacle.

5. In the process of preparing nitrocellulose in which the spent nitrating acid which is separated from the nitrocellulose has a temperature above 90° F. and is stored for reuse in a subsequent nitration, the steps which comprise passing the spent nitrating acid thru a cooling means which decreases the temperature of the acid to approximately 80° F., discarding a minor portion of the spent acid, fortifying the remainder so as to impart thereto a composition similar to that of the liquid employed in the nitration and storing the fortified nitrating acid.

WILLIAM E. SILLICK.